(12) United States Patent
Choi et al.

(10) Patent No.: US 12,380,021 B2
(45) Date of Patent: Aug. 5, 2025

(54) MEMORY SYSTEM BASED ON FLASH MEMORY AND METHOD FOR MANAGING META DATA THEREOF

(71) Applicant: SAMSUNG ELECTRONICS CO., LTD., Suwon-si (KR)

(72) Inventors: Hyun Jin Choi, Suwon-si (KR); Sunghyun Noh, Gyeonggi-Dosuwon-si (KR); Insoon Jo, Suwon-si (KR); Kui-Yon Mun, Suwon-si (KR); Myung-Jin Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/207,963

(22) Filed: Jun. 9, 2023

(65) Prior Publication Data

US 2024/0143500 A1    May 2, 2024

(30) Foreign Application Priority Data

Oct. 31, 2022    (KR) .................. 10-2022-0142453

(51) Int. Cl.
*G06F 12/00* (2006.01)
*G06F 12/02* (2006.01)
*G06F 12/0882* (2016.01)

(52) U.S. Cl.
CPC ...... *G06F 12/0246* (2013.01); *G06F 12/0292* (2013.01); *G06F 12/0882* (2013.01)

(58) Field of Classification Search
None
See application file for complete search history.

(56) References Cited

U.S. PATENT DOCUMENTS

| | | |
|---|---|---|
| 8,380,945 B2 | 2/2013 | Ye et al. |
| 8,381,018 B2 | 2/2013 | Lee et al. |
| 9,116,795 B2 | 8/2015 | Kim et al. |
| 9,195,583 B2 | 11/2015 | Jung et al. |
| 9,329,931 B2 | 5/2016 | Canepa et al. |
| 9,645,918 B2 | 5/2017 | Yun et al. |
| 9,852,061 B2 | 12/2017 | Lee et al. |
| 10,761,932 B2 | 9/2020 | Lingarajappa |
| 11,061,618 B1 | 7/2021 | Glimcher et al. |
| 2013/0042054 A1 | 2/2013 | Jung et al. |

(Continued)

FOREIGN PATENT DOCUMENTS

| | | |
|---|---|---|
| KR | 1790165 B1 | 11/2017 |
| KR | 1993704 B1 | 6/2019 |

OTHER PUBLICATIONS

Extended European Search Report in European Appln. No. 23190543.1, mailed on Jan. 26, 2024, 11 pages.

(Continued)

*Primary Examiner* — Midys Rojas
(74) *Attorney, Agent, or Firm* — Fish & Richardson P.C.

(57) ABSTRACT

A memory system which includes a flash memory including a meta block and a data block, and a memory controller including a meta data managing module managing meta data to be stored in the meta block. The meta block includes a plurality of pages. The meta data managing module compares a number of free pages of the plurality of pages with a preset number of free pages, and selects a write target page of the meta data by using one of a consecution meta write operation or a dirty meta write operation, depending on a result of the comparison.

20 Claims, 16 Drawing Sheets

(56) References Cited

U.S. PATENT DOCUMENTS

| | | |
|---|---|---|
| 2013/0046918 A1 | 2/2013 | Im |
| 2014/0115239 A1 | 4/2014 | Kong et al. |
| 2018/0210825 A1 | 7/2018 | Gim et al. |
| 2021/0092468 A1* | 3/2021 | Szatmary ............ H04N 21/8358 |
| 2023/0221875 A1* | 7/2023 | Moon ..................... G06F 3/064 |
| | | 711/112 |

OTHER PUBLICATIONS

Saxena et al., "Design and Prototype of a Solid-State Cache", ACM Transactions on Storage, Aug. 7, 2014, vol. 10, Issue 3, Article No. 10, pp. 1-34.

\* cited by examiner

MEMORY SYSTEM BASED ON FLASH MEMORY AND METHOD FOR MANAGING META DATA THEREOF

CROSS-REFERENCE TO RELATED APPLICATIONS

A claim of priority under 35 U.S.C. § 119 is made to Korean Patent Application No. 10-2022-0142453 filed on Oct. 31, 2022 in the Korean Intellectual Property Office, the entirety of which is hereby incorporated by reference.

BACKGROUND

The present disclosure relates to semiconductor memory devices, and more particularly to memory systems based on flash memory and meta data managing methods thereof.

Semiconductor memory devices may generally be classified as volatile semiconductor memory devices and non-volatile semiconductor memory devices. Volatile semiconductor memory devices have fast read and write speeds, but however lose stored data when power supply is cut off. In contrast, non-volatile semiconductor memory devices retain stored data when power supply is cut off. Consequently, non-volatile semiconductor memory devices are typically used to store data that must be retained regardless of disruption of power supply.

Flash memory is a representative example of non-volatile memory. Flash memory is widely used as a storage medium of voice and image data in information devices such as computers and smartphones. Currently, high-capacity, high-speed input/output, and low-power technologies for flash memories are actively being studied for use in mobile devices such as smartphones.

Flash memory may however be disadvantageous in that write speeds and erase speeds are slower than read speeds, there is a limitation on the number of times of use, and over-writing is impossible. Because of this, garbage collection operations in flash memory should be separately performed to secure space when writable space is insufficient. However, garbage collection operations may delay running processes of flash memory. Accordingly, a method for decreasing such delay time is required.

SUMMARY

Embodiments of the inventive concepts provide a flash memory-based memory system utilizing write locality such that the number of garbage collection operations decreases and an open time of a storage device decreases, and a meta data managing method thereof.

Embodiments of the inventive concepts provide a memory system including a flash memory including a meta block and a data block, the meta block including a plurality of pages; and a memory controller including a meta data managing module that manages meta data to be stored in the meta block. The meta data managing module compares a number of free pages from among the plurality of pages with a set free page count to provide a comparison result; and selects a write target page of the meta data from among the free pages, by using one of a consecution meta write operation or a dirty meta write operation depending on the comparison result.

Embodiments of the inventive concepts further provide a meta data managing method of a memory system which is based on a flash memory including a meta block, the meta block including a plurality of pages. The method includes comparing a number of free pages from among the plurality of pages with a set free page count to provide a comparison result; and selecting a write target page of meta data from among the free pages, by using one of a consecution meta write operation and a dirty meta write operation depending on the comparison result. The selecting includes selecting the write target page of the meta data using the dirty meta write technique when the number of free pages is greater than the set free page count, and selecting the write target page of the meta data using the consecution meta write operation when the number of free pages is less than or equal to the set free page count.

Embodiments of the inventive concepts still further provide a memory controller connected with a flash memory including a meta block, the meta block including a plurality of pages. The memory controller including a page selection table module that stores indication of an order of writing to free pages from among the plurality of pages and that does not invoke meta garbage collection; a distance check selector that manages a set free page count, compares a number of free pages and the set free page count to provide a comparison result, and manages one of a consecution meta write operation and a dirty meta write operation depending on the comparison result; and a dirty selector that selects a meta page targeted for write as a write target page from among dirty meta pages of the plurality of pages. The distance check selection module selects the write target page of the meta data using the dirty meta write operation when the number of free pages is greater than the set free page count. The distance check selection module selects the write target page of the meta data using the consecution meta write operation when the number of free pages is less than or equal to the set free page count.

BRIEF DESCRIPTION OF THE FIGURES

The above and other objects and features of the present disclosure will become apparent in view of the following detailed description of embodiments thereof with reference to the accompanying drawings.

FIG. 3 illustrates a flowchart of a method for managing meta data before a power-off event occurs in a state where a memory system shown in FIG. 1 is powered on.

DETAILED DESCRIPTION

Hereinafter, embodiments of the inventive concepts will be described in detail. As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
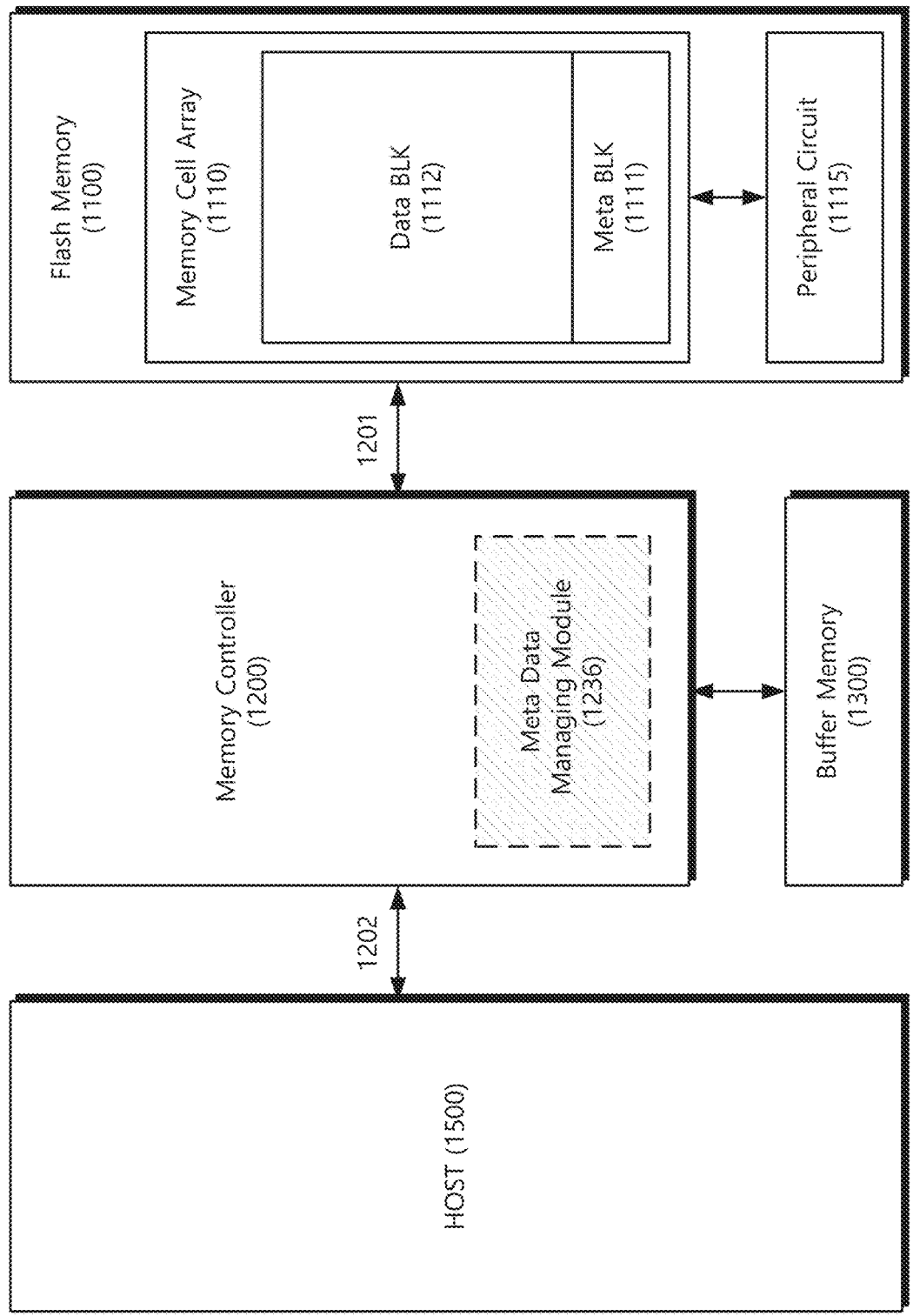
FIG. 1 illustrates a block diagram of a memory system according to embodiments of the inventive concepts.

FIG. 1 illustrates a block diagram of a memory system according to embodiments of the inventive concepts. Referring to FIG. 1, a memory system includes a flash memory 1100, a memory controller 1200, a buffer memory 1300, and a host 1500.

The flash memory 1100 may be connected with the memory controller 1200 through a flash interface 1201. The flash memory 1100 includes memory cell array 1110 and peripheral circuit 1115. The peripheral circuit 1115 may include both analog and/or digital circuits necessary to store data in the memory cell array 1110, and analog and/or digital circuits necessary to read data from the memory cell array 1110.

The memory cell array 1110 may include a plurality of memory blocks. Each of the memory blocks may have a vertical three-dimensional structure. The memory cell array 1110 may be placed next to the peripheral circuit 1115 or on the peripheral circuit 1115 in a design/layout structure. A structure in which the memory cell array 1110 is placed on the peripheral circuit 1115 may be characterized as a cell on peripheral (COP) structure. The memory cell array 1110 may be implemented with a chip that is independent of the peripheral circuit 1115. An upper chip including the memory cell array 1110 and a lower chip including the peripheral circuit 1115 may be coupled to each other by a bonding scheme and the structure may be characterized as a chip to chip (C2C) structure.

The memory cell array 1110 may include a meta block 1111 and a data block 1112. The meta block 1111 may store meta data. The meta data may refer to data that are generated to manage user data or the flash memory 1100. The meta data may for example include mapping information used to translate a logical address into a physical address of the flash memory 1100, and may also include pieces of information for managing a memory space of the flash memory 1100.

The memory controller 1200 may be connected with the host 1500 through a host interface 1202. The host interface 1202 may include an interface complying with standards such as for example Advanced Technology Attachment (ATA), Serial-ATA (SATA), Parallel-ATA (PATA), Universal Serial Bus (USB), Small Component Small Interface (SCSI), Enhanced Small Disk Interface (ESDI), IEEE 1394, and Integrated Drive Electronics (IDE) or a card interface. The memory controller 1200 may include a meta data managing module 1236.

When power is supplied to the memory system, the meta data managing module 1236 may generate a command and an address for sequentially reading pieces of meta data of the flash memory 1100 which are divided into a plurality of groups (or segments), and storing the read meta data in the buffer memory 1300. The meta data managing module 1236 may update meta data stored in the buffer memory 1300 depending on an operation of the flash memory 1100 which causes a change of the meta data, may generate log entry information corresponding to the meta data change, and may store the log entry information in the buffer memory 1300.

The log entry information may include information necessary to restore the change of the meta data. As an example, the log entry information may include information about a type indicating an operation in which the change of the meta data is caused (i.e., the type of operation which caused the change of the meta data), and actual data for restoring the change of the meta data. The information about the type indicating the operation in which the change of the meta data is caused may include pieces of information defining types of all operations which cause the change of the meta data, such as for example a write operation, a block allocation operation, and a page copy operation. The actual data for restoring the change of the meta data may include a logical address, a previous physical address, a new physical address, etc. Log data are composed of pieces of log entry information.

The meta data managing module 1236 may control the memory controller 1200 such that meta data corresponding to one selected group from among the pieces of meta data, which are stored in the buffer memory 1300 in a state of being divided into the plurality of groups, and the log data are stored in the flash memory 1100 whenever the number of log entry information stored in the buffer memory 1300 reaches an initially set threshold value.

As an example, when a log entry region allocated to the buffer memory 1300 is fully filled with the log entry information, the pieces of meta data, which are stored in the buffer memory 1300 in a state of being divided into the plurality of groups, may be selected one by one in a round-robin manner, and the meta data of the selected group and the log data may be stored in the flash memory 1100.

For example, in the case where the meta data are divided into MD1 to MDn groups (n being the number of groups) and are stored in the buffer memory 1300, the meta data may be selected for each group sequentially from MD1 to MDn in round-robin manner, and the meta data of the group thus selected may be stored in the flash memory 1100 together with the log data. After storing the log data in the flash memory 1100, the meta data managing module 1236 may delete pieces of log entry information present in the buffer memory 1300. As such, the log entry region allocated to the buffer memory 1300 is emptied.

When a power-off event occurs abnormally and a power-on event thereafter occurs, the meta data managing module 1236 may read from the flash memory 1100 valid log data and valid divided meta data for each group in the order that the meta data was stored in the flash memory 1100, and may restore the meta data. Herein, the abnormal power-off event means an event where power supply is blocked or cut off in a state where a power-off command is (or was) not input to the memory system.

The buffer memory 1300 temporarily stores data provided from the host 1500 and data generated by the memory controller 1200, or temporarily stores data to be provided to the host 1500. Also, a region capable of storing the meta data and the log data may be allocated to the buffer memory 1300. The buffer memory 1300 may be implemented with a DRAM or an SRAM.

Figure 2:
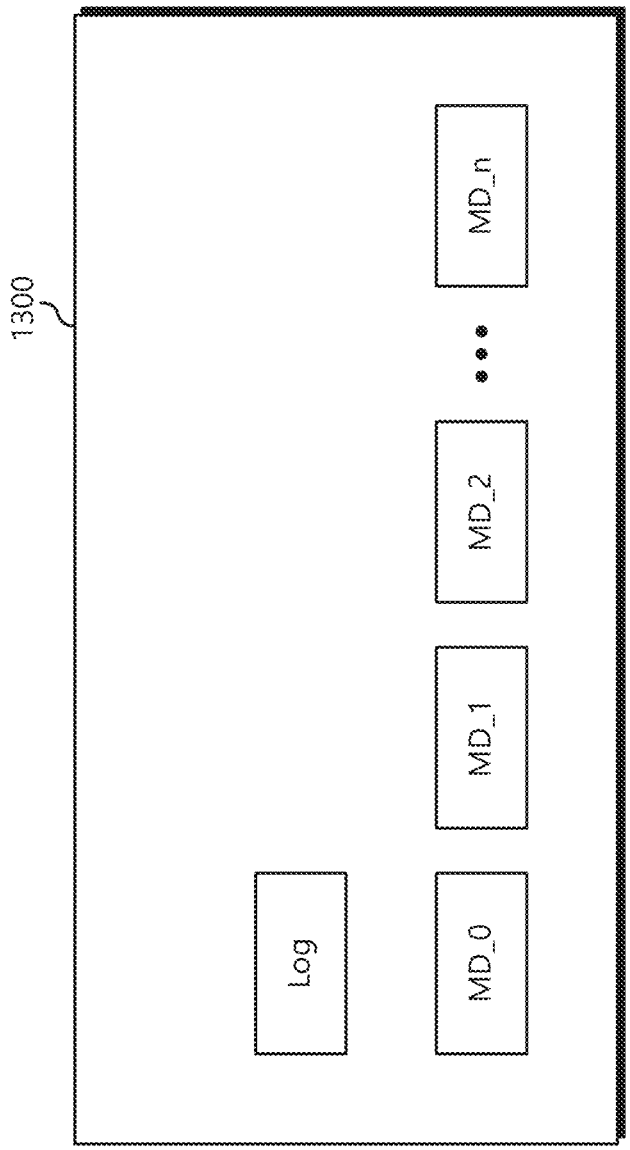
FIG. 2 illustrates a block diagram of an example of data stored in a buffer memory of FIG. 1.

FIG. 2 illustrates a block diagram of an example of data stored in a buffer memory shown in FIG. 1. Referring to FIG. 2, the meta data that are divided into a plurality of groups may be stored in the buffer memory 1300. The log data stored in the buffer memory 1300 may be composed of log entries, the number of which is limited.

As an example, the meta data may be divided by a physical page storage unit of the flash memory 1100. Also, a page whose size corresponds to a multi-plane may be divided by an arbitrary size internally such that a portion of the meta data and the log data are stored.

Also, a division size of the meta data and the number of log entries constituting the log data may be determined such that one group of meta data and log data may be together stored at one physical page of the flash memory 1100. The meta data may be divided into the plurality of groups based on a logical address. FIG. 2 shows an example in which the meta data are divided into (n+1) groups.

The meta data managing module 1236 may manage the meta data for each group thus divided. In detail, the meta data managing module 1236 may store the updated meta data and log data in the flash memory 1100 and may also perform the process of restoring the meta data by using the stored log data.

For example, the meta data managing module 1236 may store the meta data and log data updated in the following manner in the flash memory 1100. First, it is assumed that the meta data are divided into groups to have a given size and the meta data of each group is marked by "MD_i". Herein, i=0, 1, 2, ..., and n and (n+1) indicates a value that is used to divide the meta data. That is, (n+1) indicates the number of divided meta data groups. Divided meta data MD_i of one group corresponds to one meta data segment constituting the meta data.

The updated meta data may be immediately applied on the buffer memory 1300, and log data capable of being restored from meta data before update are separately stored. When the size of the stored log data corresponds to the allocated size, the log data and the divided meta data of some groups may be selected, and the selected meta data are written in the flash memory 1100 at the same time point as the log data.

A portion of the i-th meta data written in the flash memory 1100 at any time point Tj is referred to as "MD_i(Tj)". Also, the log data written in the flash memory 1100 at the same time point Tj is referred to as "Log(Tj)". In this case, MD_i(Tj) includes the entire log data Log(Tk) where k≤j. In other words, meta data written from buffer memory 1300 to flash memory 1100 at a certain point in time includes the entire log data from before the certain point in time. In contrast, MD_i(Tj) may be restored by replaying the log data Log(Tk) where j<k. In other words, meta data written from buffer memory 1300 to flash memory 1100 at a certain point in time may be restored by replaying log data written to flash memory 1100 after the certain point in time. When MD_i (Tj) is written in the flash memory 1100, MD_i(Tk) where j<k is invalid meta data.

The meta data segment MD_i divided by using the above characteristic is selected in the round-robin manner and is sequentially stored in flash memory 1100. In this case, after one round from a time point Tj1 at which MD_i1 is selected and written, when it passes a time point Tj2 at which MD_i2 is selected and written in a next round, Log(Tj) where j<j1 is invalid log data. Also, with regard to MD_i(Tj) written in a time period from Tj1 to Tj2, meta data being MD_i(Tk) is invalidated.

Meanwhile, the meta data managing module 1236 may restore the meta data by using the log data stored in the following manner. A meta data segment is read in the order in which the meta data segment was written in the flash memory 1100. In this case, only a valid segment is read. When log data written in the flash memory 1100 at a relevant time point are valid, the relevant log data are also read. After reading the log data, meta data segments written before the time point at which the log data are written are restored by using the log data. In the case where restoration information remaining in the log data is associated with meta data segments that are not yet read, the meta data segments are not restored. The above process is repeated until the lastly written meta data segment and log data are read. For example, this will be subsequently described with reference to FIG. 6.

For example, it is assumed that MD_i0(Tj0) is first read from the flash memory 1100, all the log data before a time point Tj1 in flash memory 1100 are invalided, and log data and a meta data segment are written until a time point Tj2. According to the above assumption, with regard to a meta data segment MD_i(Tj) written at a time point where there is satisfied "j0≤j≤j1", log data are not read, and only meta data are read.

Also, a meta data segment MD_i(Tj) and Log(Tj) written at a time point where there is satisfied "j1≤j≤j2" are together read, and restoration is performed on a meta data segment MD_i(TK) where k<j by using the read Log(Tj). In an embodiment, a meta data segment and log data are read while meta data are restored by replaying log data (i.e., the process of restoring overlaps the process of reading).

Figure 3:
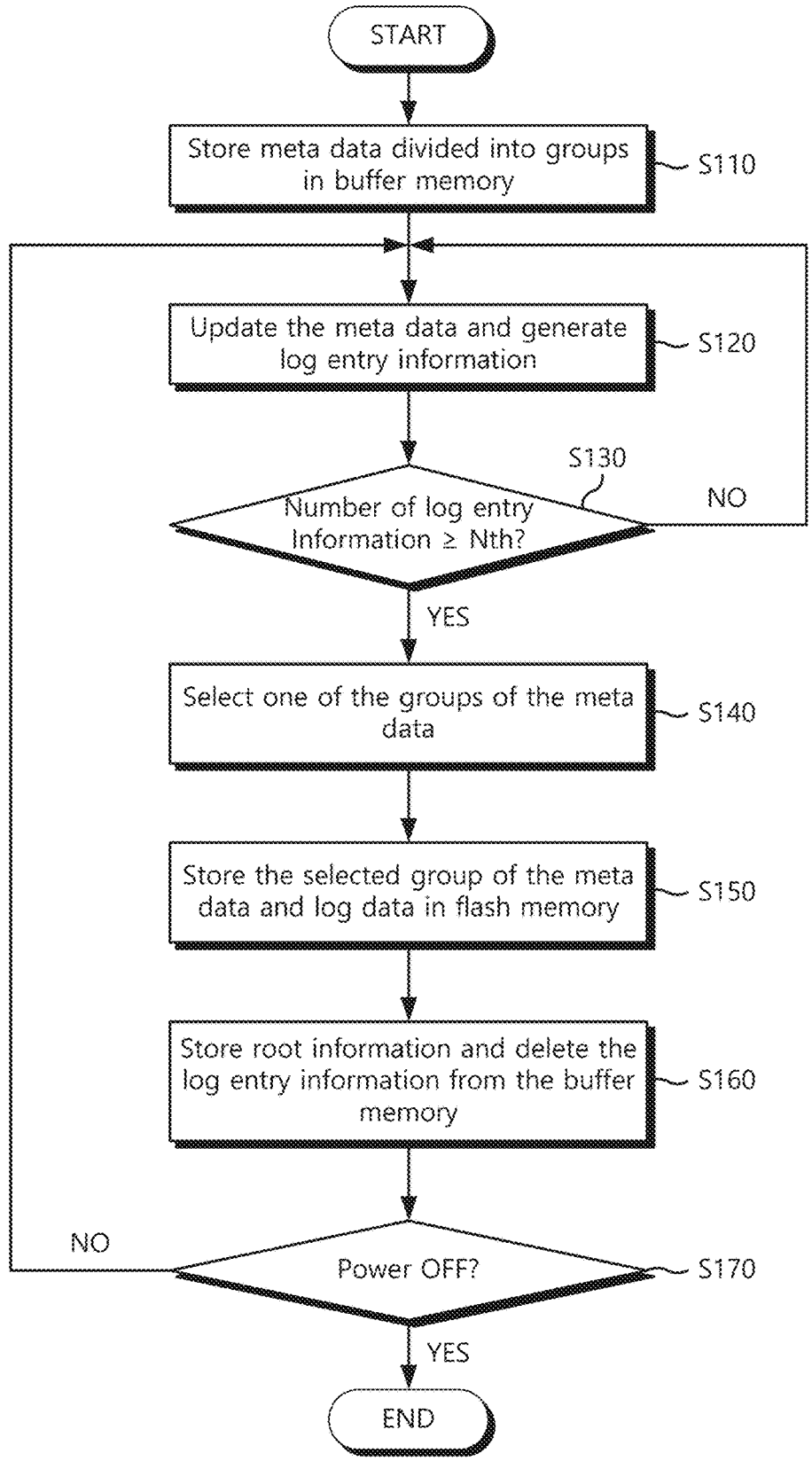

FIG. 3 illustrates a flowchart of a method for managing meta data before a power-off event occurs in a state where a memory system shown in FIG. 1 is powered on. FIG. 3 shows a method for storing the divided meta data and the log data in the flash memory 1100.

In operation S110, the memory controller 1200 reads divided meta data segments from the flash memory 1100, and stores the read data segments in the buffer memory 1300. That is, when the memory system is powered on, the memory controller 1200 reads meta data of each group corresponding to a segment of meta data from the flash memory 1100, and stores the read meta data in the buffer memory 1300. As an example, in the case where meta data are divided into four groups (or segments), four groups of meta data MD_0, MD_1, MD_2, and MD_3 may be stored in the buffer memory 1300.

When an operation causing a change of meta data is performed in the memory system, in operation S120, the memory system updates the meta data present in the buffer memory 1300, generates the log entry information corresponding to the meta data change, and stores the log entry information in the buffer memory 1300. That is, when there is performed an operation causing a meta data change, such as an operation of writing data in the flash memory 1100, the memory controller 1200 searches for meta data of a group targeted for the meta data change from the buffer memory 1300 and updates the meta data of the group thus found.

In addition, the memory controller 1200 generates the log entry information and stores the log entry information in the buffer memory 1300. The log entry information may include information about a type indicating the operation causing the change of the meta data, and actual data for restoring the change of the meta data.

In operation S130, the memory controller 1200 determines whether the number of generated log entry information reaches an initially set threshold value Nth. As an example, whether the number of generated log entry information reaches the initially set threshold value Nth may be determined based on whether the log entry region allocated to the buffer memory 1300 is fully filled with the log entry information.

When a determination result in operation S130 indicates that the number of generated log entry information has not reached (or in other words is less than) the initially set threshold value Nth (No in S130), the procedure returns to operation S120. When the determination result in operation S130 indicates that the number of generated log entry information has reached the initially set threshold value Nth, or in other words is greater than or equal to Nth (Yes in S130), operation S140 is performed.

In operation S140, the memory controller 1200 may select one group of meta data from a plurality of groups of meta data stored in the buffer memory 1300. As an example, all groups of meta data may be sequentially selected in round-robin manner. This example of selection may be characterized as consecution meta write, which refers to a way or operation in which all meta pages are selected in round-robin manner regardless of changed meta pages, when a meta write request is received.

As another example, only meta data groups in which an update has occurred may be sequentially selected in round-robin manner. This example of selection may be characterized as dirty meta write, which refers to a way or operation in which only meta pages in which an update has occurred are selected, when the meta write request is received.

In operation S150, the memory controller 1200 reads the log data and the meta data of the group selected from the buffer memory 1300 in operation S140, and stores the read log data and meta data in the flash memory 1100.

In operation S160, the memory controller 1200 stores root information about the meta data stored in operation S150 in the flash memory 1100 and deletes the log entry information present in the buffer memory 1300. Herein, the root information about the meta data may include information about a physical position of the flash memory 1100, at which the meta data and the log data are stored, and information about a storage order for each meta data group.

In operation S170, determination is made as to whether a power-off event occurs in the memory system. When a power-off event occurs, the procedure ends (Yes at S170). When a power-off event does not occur (NO at S170), the procedure returns to operation S120. Referentially, when a normal power-off event occurs, the power supplied to the memory system may be blocked or turned off after all groups of meta data updated in the buffer memory 1300 are stored in the flash memory 1100.

Operations S140-S160 in FIG. 3 may be repeated prior to entering operation S170 until all groups of meta data are sequentially selected in the case of a consecution meta write, or until only all meta pages in which an update has occurred are sequentially selected in the case of a dirty meta write.

Figure 4:
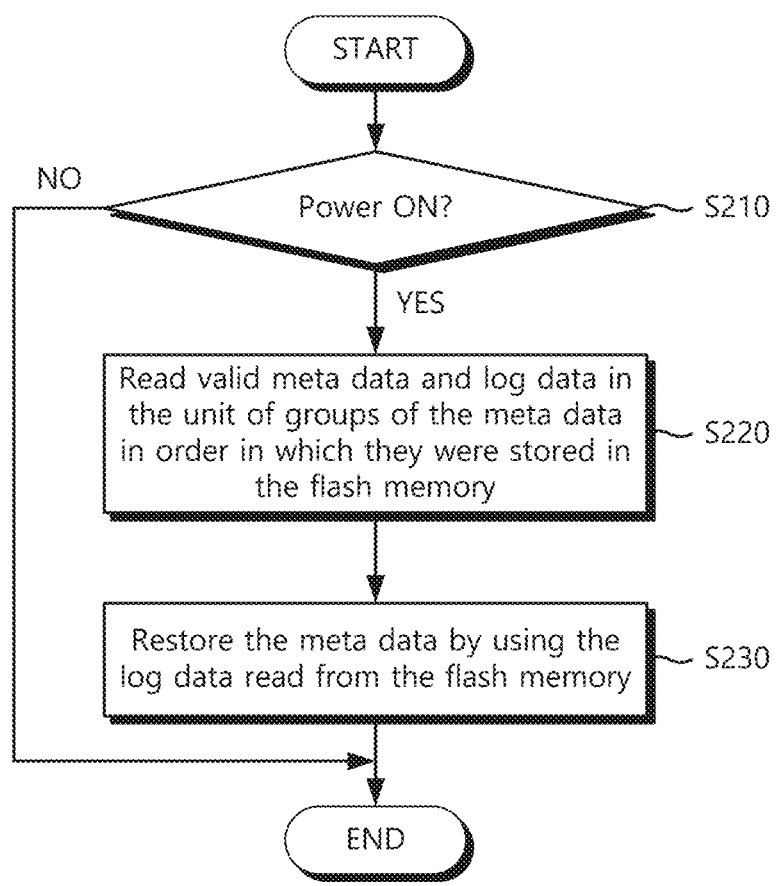
FIG. 4 illustrates a flowchart of a meta data restoring method of a memory system shown in FIG. 1.

FIG. 4 illustrates a flowchart of a meta data restoring method of a memory system shown in FIG. 1.

In operation S210, the memory controller 1200 determines whether the memory system is powered on. If the power is not turned on (No at S210), the meta data restoring operation will not be performed. When the memory system is powered on (Yes at S210), operation S220 is performed.

In operation S220, valid meta data and log data are read in units of group in the order in which the meta data was stored in the flash memory 1100. In the case where valid log data are absent from the flash memory 1100, only valid meta data are read for each group. Information about positions where meta data and log data are stored and information about a storage order may be obtained from a root information region of the flash memory 1100.

In operation S230, the memory controller 1200 sequentially restores the meta data by using the read log data. As an example, valid meta data stored prior to the read log data may be restored by using the read log data. A time period in which there is performed the process of reading log data and meta data may overlap a time period in which there is performed the process of restoring the meta data by replaying the log data.

The meta data managing module 1236 according to embodiments of the inventive concepts may selectively perform the consecution meta write operation and the dirty meta write operation. For example, the meta data managing module 1236 may use all meta pages in round-robin manner regardless of updated meta pages, and after a specific time point, may use only meta pages in which an update has occurred.

Figure 5:
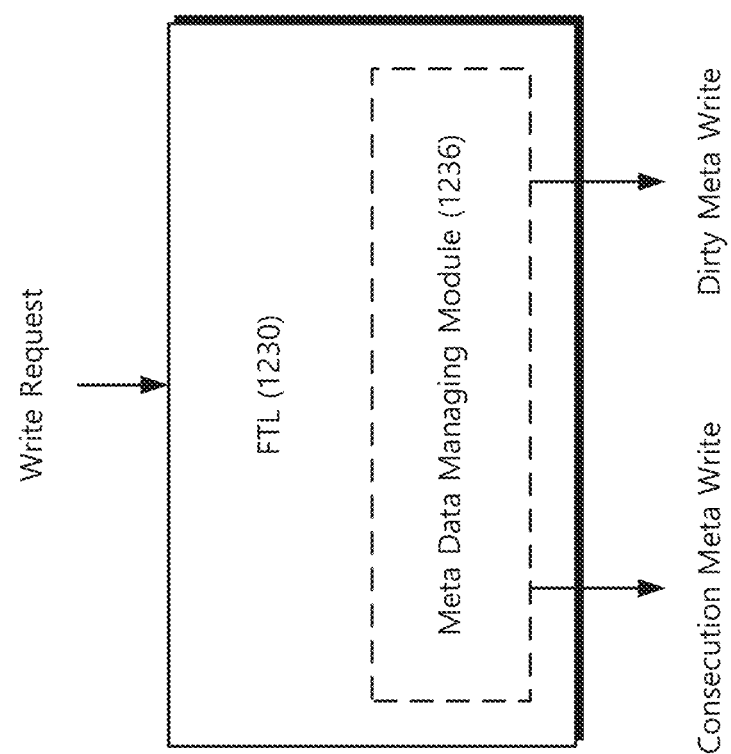
FIG. 5 illustrates a block diagram descriptive of a meta data managing module shown in FIG. 1.

FIG. 5 illustrates a block diagram descriptive of a meta data managing module illustrated in FIG. 1. Referring to FIG. 5, a flash translation layer 1230 may receive the meta write request from the host 1500 and may perform a meta data managing operation. To this end, the flash translation layer 1230 may include the meta data managing module 1236.

The meta data managing module 1236 may perform the meta data managing operation by selectively performing the consecution meta write operation and the dirty meta write operation. The consecution meta write refers to a way or operation that uses all meta pages in round-robin manner regardless of changed meta pages, when the meta write request is received. The dirty meta write refers to a way or operation that uses only changed meta pages when the meta write request is received.

Figure 6:
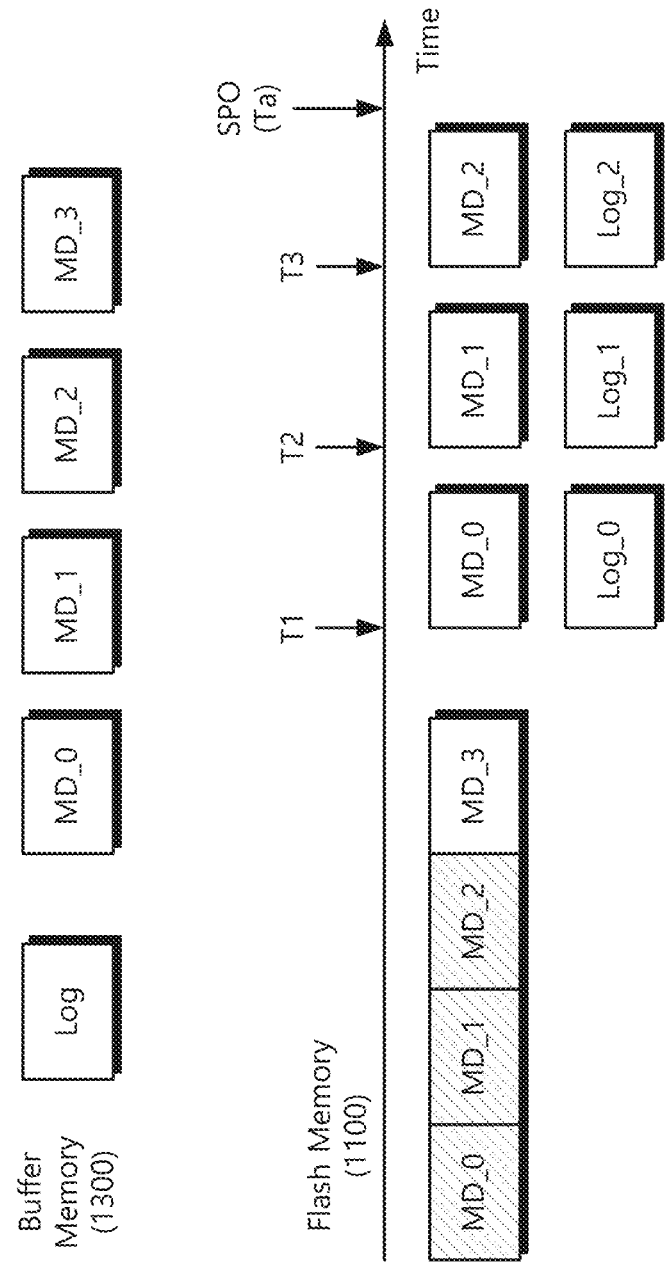
FIG. 6 illustrates a timing diagram descriptive of a consecution meta write method of a meta data managing module shown in FIG. 3.

FIG. 6 illustrates a timing diagram descriptive of a consecution meta write method or operation of a meta data managing module shown in FIG. 3. FIG. 6 shows an example in which four groups of meta data are selected in round-robin manner and the selected group of meta data and the log data are together stored in the flash memory 1100.

Referring to FIG. 6, in the case where log data of a first time point T1 at which the log entry region in buffer memory 1300 is fully filled with log data information is "Log_0" and a meta data segment selected in this case is an 0-th group of meta data MD_0, MD_0 and Log_0 are simultaneously stored in the flash memory 1100 at the first time point T1. When MD_0 is stored in the flash memory 1100 at the first time point T1, MD_0 previously stored in the flash memory 1100 is invalidated. Referentially, the invalidated meta data segment MD_0 previously stored is indicated by shading.

In the case where log data of a second time point T2 at which the log entry region in buffer memory 1300 is fully filled with log data information is "Log_1" and a meta data segment selected in this case is a first group of meta data MD_1, MD_1 and Log_1 are simultaneously stored in the flash memory 1100 at the second time point T2. When MD_1 is stored in the flash memory 1100 at the second time point T2, MD_1 previously stored in the flash memory 1100 is invalidated as indicated by shading.

In the case where log data of a third time point T3 at which the log entry region is fully filled with log data information is "Log_2" and a meta data segment selected in this case is a second group of meta data MD_2, MD_2 and Log_2 are simultaneously stored in the flash memory 1100 at the third time point T3. When MD_2 is stored in the flash memory 1100 at the third time point T3, MD_2 previously stored in the flash memory 1100 is invalidated as indicated by shading.

Figure 7:
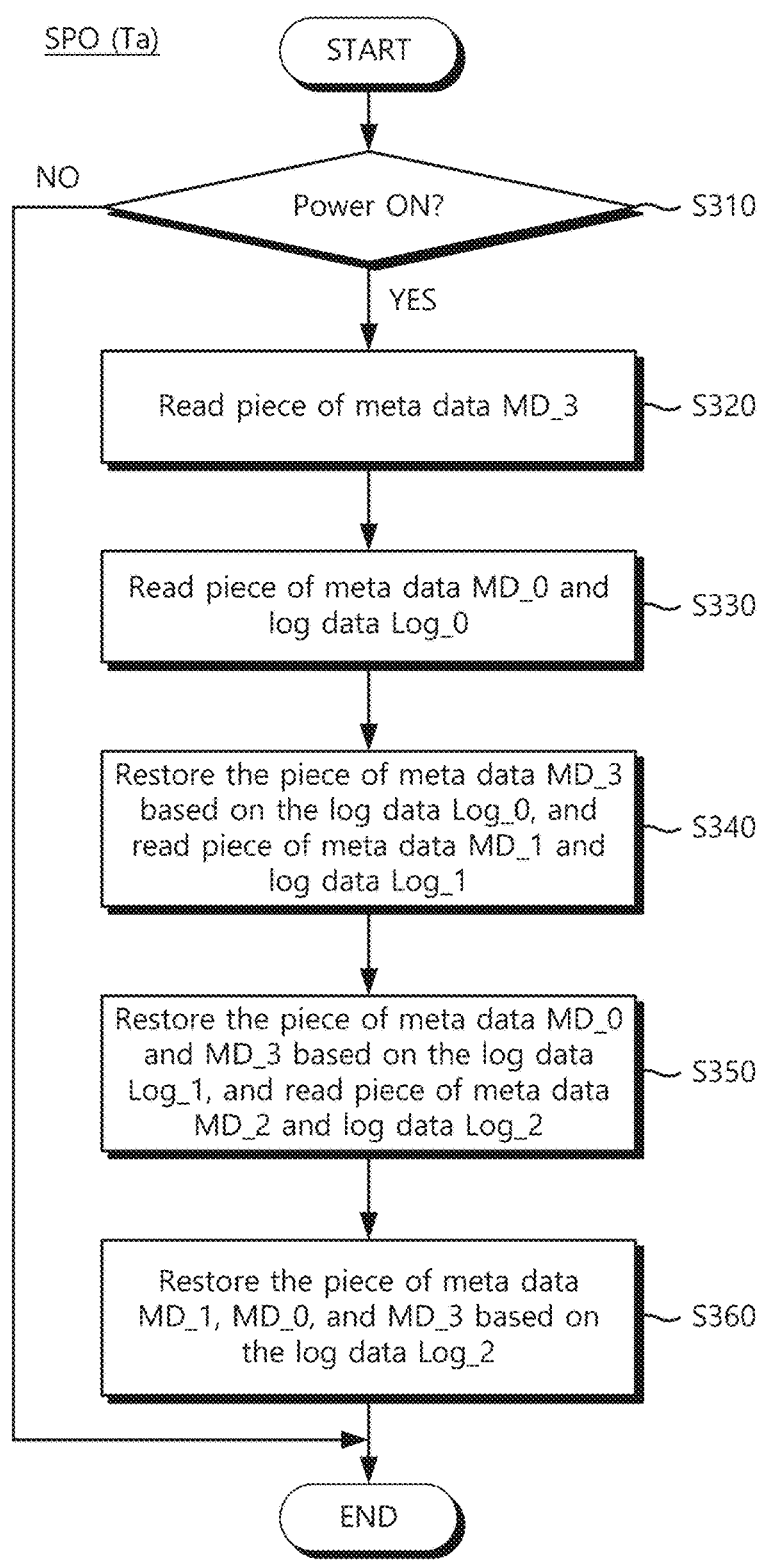
FIG. 7 illustrates a flowchart of an operation of restoring meta data when an abnormal power-off event occurs at a time point Ta in a state where meta data and log data are stored in a flash memory as shown in FIG. 6.

FIG. 7 illustrates a flowchart of an operation of restoring meta data after an abnormal power-off event (e.g., SPO) occurs at a time point Ta in a state where meta data and log data are stored in a flash memory as shown in FIG. 6.

The memory controller 1200 determines whether the memory system is powered on (S310). When the memory system is powered on (Yes at S310), the memory controller 1200 searches for position information of meta data and log data stored in the root information region of the flash memory 1100 and information about the order of storing the meta data therein, and reads a group of meta data which are valid, in the order in which the meta data was stored in the flash memory 1100 by using the found information. Firstly, it is confirmed from FIG. 6 that MD_3 is valid meta data stored in the flash memory 1100. Accordingly, MD_3 is read from flash memory 1100 and is then stored in the buffer memory 1300 (S320).

Because (MD_0, Log_0) was stored in the flash memory 1100 after MD_3, (MD_0, Log_0) is read and is then stored in the buffer memory 1300 (S330).

Because MD_3 was written in the flash memory 1100 before a time point at which Log_0 was written, MD_3 stored in the buffer memory 1300 is restored based on Log_0. Because (MD_1, Log_1) was stored in the flash memory 1100 after (MD_0, Log_0), (MD_1, Log_1) is read and is then stored in the buffer memory 1300 (S340). To decrease a total of time taken to restore meta data, the process of restoring MD_3 and the process of reading (MD_1, Log_1) may be simultaneously performed at operation S340.

Because MD_0 and MD_3 were written in the flash memory 1100 before a time point at which Log_1 was written, MD_0 and MD_3 stored in the buffer memory 1300 are respectively restored based on Log_1. (MD_2, Log_2) stored in the flash memory 1100 after (MD_1, Log_1) is read and is then stored in the buffer memory 1300 (S350). The process of restoring MD_0 and MD_3 and the process of reading (MD_2, Log_2) may be simultaneously performed at operation S350.

Because MD_1, MD_0, and MD_3 were written in the flash memory 1100 before the time point at which Log_2 was written, MD_1, MD_0, and MD_3 stored in the buffer memory 1300 are respectively restored based on Log_2. As illustrated in FIG. 6, because meta data and log data are absent from the flash memory 1100 after (MD_2, Log_2), the restoration process ends after operation S360.

Figure 8:
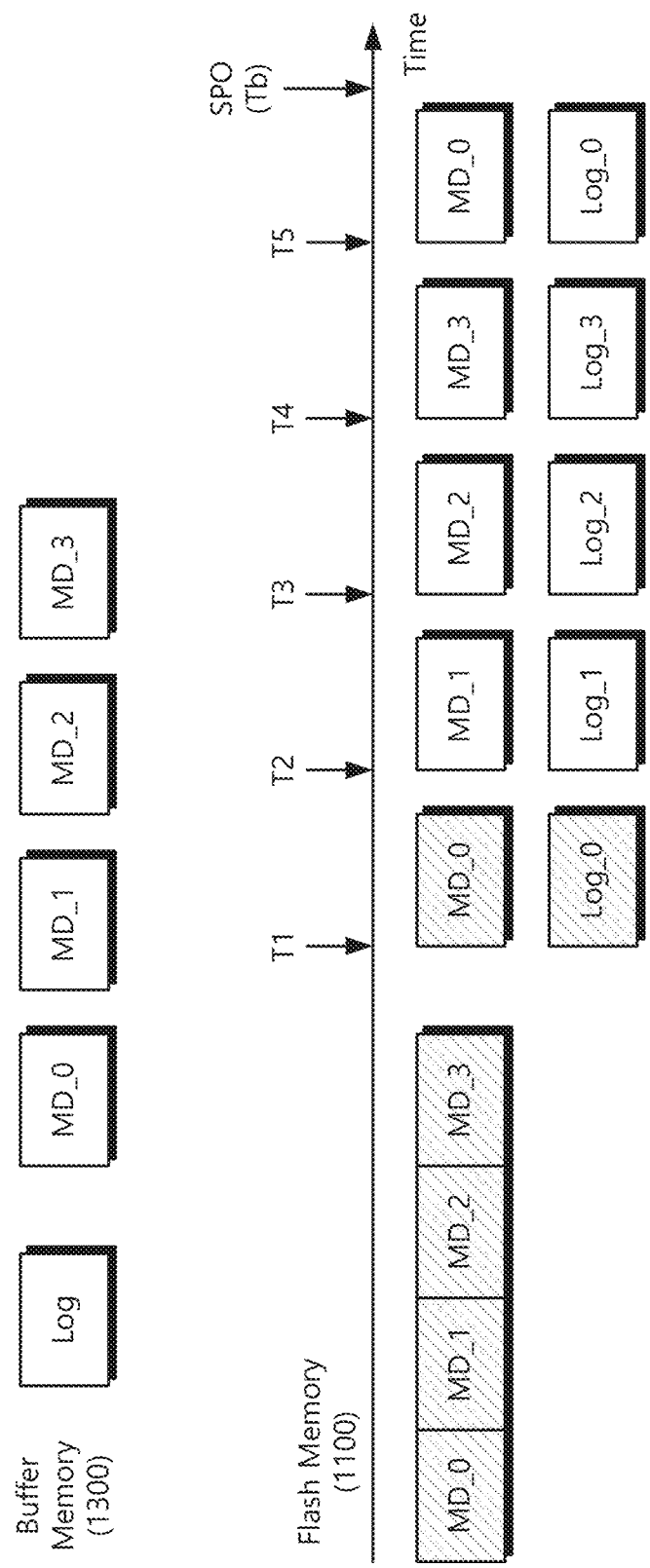
FIG. 8 illustrates a timing diagram descriptive of a consecution meta write method of a meta data managing module shown in FIG. 3.

FIG. 8 illustrates a timing diagram descriptive of a consecution meta write method or operation of a meta data managing module shown in FIG. 3. FIG. 8 shows an example in which the consecution meta write operation illustrated in FIG. 6 continues until a time point Tb.

Referring to FIG. 8, in the case where log data of a fourth time point T4 at which the log entry region is fully filled with log data information is "Log_3" and a meta data segment selected in this case is a third group of meta data MD_3, MD_3 and Log_3 are simultaneously stored in the flash memory 1100 at the fourth time point T4. When MD_3 is stored in the flash memory 1100 at the fourth time point T4, MD_3 previously stored in the flash memory 1100 is invalidated as indicated by shading. As the selection of all groups of meta data is completed at the fourth time point T4, all groups of meta data are stored in the flash memory 1100.

In the case where log data of a fifth time point T5 at which the log entry region is fully filled with log data information is "Log_0" and a meta data segment selected in this case is the 0-th group of meta data MD_0, MD_0 and Log_0 are simultaneously stored in the flash memory 1100 at the fifth time point T5. When (MD_0, Log_0) is stored in the flash memory 1100 at the fifth time point T5, (MD_0, Log_0) previously stored in the flash memory 1100 is invalidated.

Figure 9:
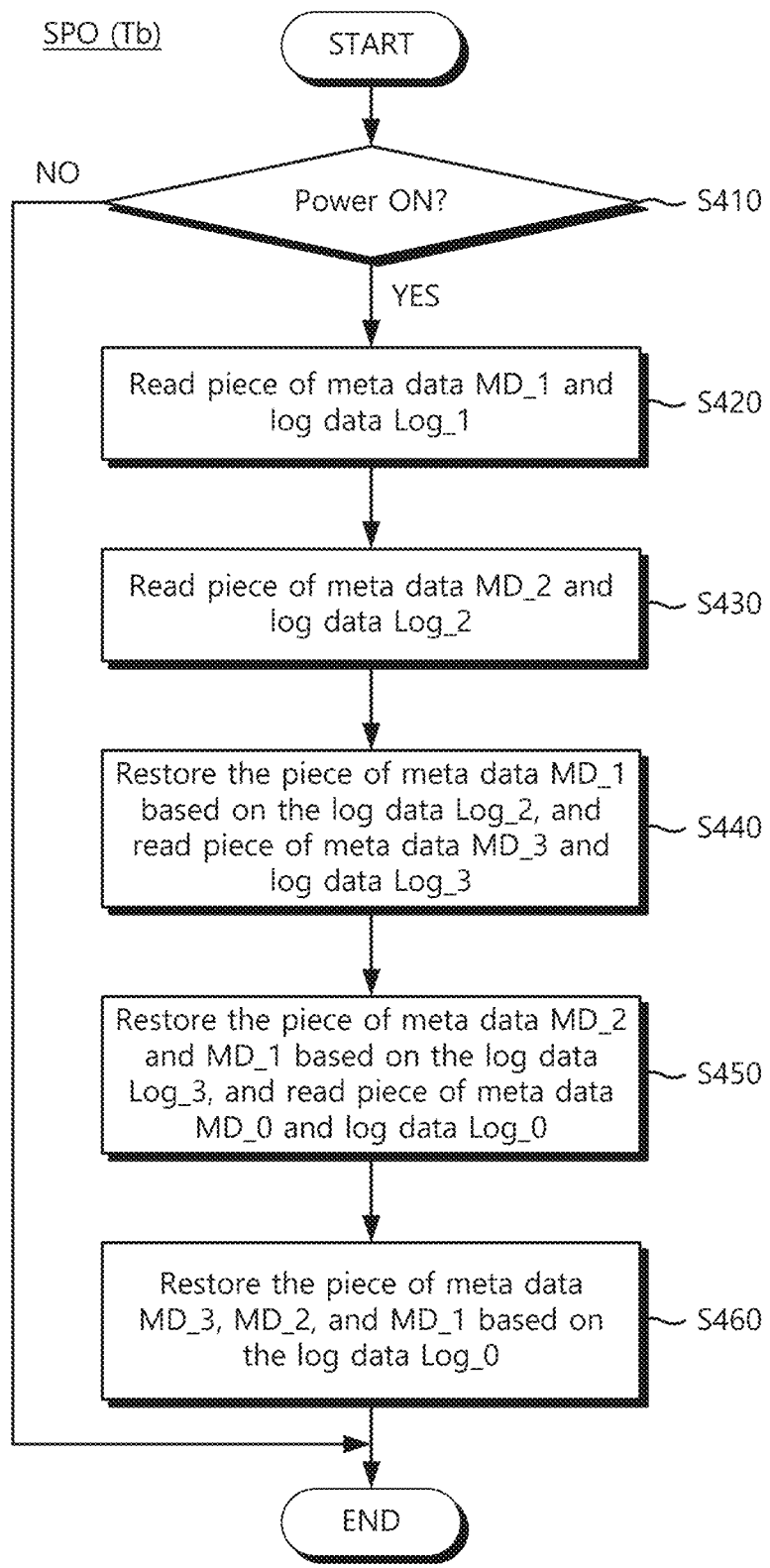
FIG. 9 illustrates a flowchart of an operation of restoring meta data when an abnormal power-off event occurs at a time point Tb in a state where meta data and log data are stored as shown in FIG. 8.

FIG. 9 illustrates a flowchart of an operation of restoring meta data after an abnormal power-off event occurs at a time point Tb in a state where meta data and log data are stored as illustrated in FIG. 8.

The memory controller 1200 determines whether the memory system is powered on (S410). When the memory system is powered on (Yes at S410), the memory controller 1200 searches for position information of meta data and log data stored in the root information region of the flash memory 1100 and information about the order of storing the meta data therein and reads a group of meta data, which are valid, in the order in which meta data was stored in the flash memory 1100 by using the found information.

Firstly it is confirmed from FIG. 8 that MD_1 is valid meta data stored in the flash memory 1100. Accordingly, (MD_1, Log_1) is read and is then stored in the buffer memory 1300 (S420). However, it is not necessary to read the log data when valid meta data stored in the flash memory 1100 are firstly read. Accordingly, in some embodiments only MD_1 may be read and may then be stored in the buffer memory 1300.

Because (MD_2, Log_2) was stored in the flash memory 1100 after (MD_1, Log_1), (MD_2, Log_2) is read and is then stored in the buffer memory 1300 (S430).

Because MD_1 was written in the flash memory 1100 before a time point at which Log_2 was written, MD_1 stored in the buffer memory 1300 is restored based on Log_2. (MD_3, Log_3) stored in the flash memory 1100 is read after (MD_2, Log_2) and is then stored in the buffer memory 1300 (S440). The process of restoring MD_1 based on Log_2 and the process of reading (MD_3, Log_3) may be simultaneously performed at operation S440.

Because MD_2 and MD_1 were written in the flash memory 1100 before a time point at which Log_3 was written, MD_2 and MD_1 stored in the buffer memory 1300 are respectively restored based on Log_3. (MD_0, Log_0) stored in the flash memory 1100 is read after (MD_3, Log_3) and is then stored in the buffer memory 1300 (S450). The process of restoring MD_2 and MD_1 based on Log_3 and the process of reading (MD_0, Log_0) may be simultaneously performed at operation S450.

Because MD_3, MD_2, and MD_1 were written in the flash memory 1100 before the time point at which Log_0 was written, MD_3, MD_2, and MD_1 stored in the buffer memory 1300 are respectively restored based on Log_0. As illustrated in FIG. 8, because meta data and log data are absent from the flash memory 1100 after (MD_0, Log_0), the restoration process ends.

According to the consecution meta write, all meta pages are used in round-robin manner regardless of changed meta pages. Accordingly, the consecution meta write may not require a meta garbage collection operation and thus may minimize a meta space. Herein, the meta garbage collection operation may refer to an operation of moving valid meta page data when the number of free meta pages of a meta block is insufficient.

In the consecution meta write, as a capacity of flash memory 1100 increases, an open time may increase. Also, according to the consecution meta write, all the meta pages may be sequentially used in a state where write locality is excluded. The number of meta pages is proportional to the capacity of the flash memory 1100. Accordingly, the consecution meta write may cause an increase in the number of journals to be replayed in a sudden power-of recovery (SPOR) operation.

Figure 10:
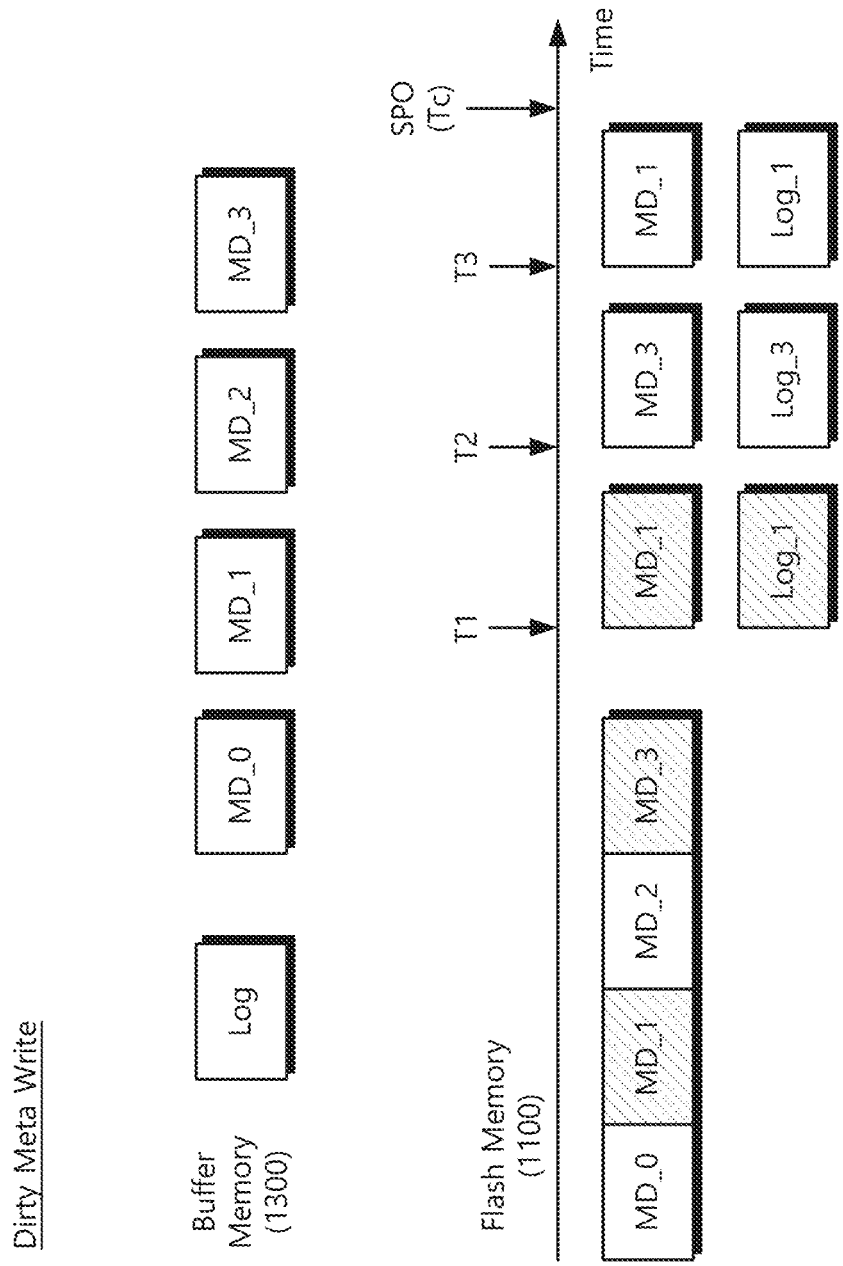
FIG. 10 illustrates a timing diagram descriptive of a dirty meta write method of a meta data managing module shown in FIG. 3.

FIG. 10 illustrates a timing diagram descriptive of a dirty meta write method of a meta data managing module illustrated in FIG. 3. FIG. 10 shows an example in which only a group of meta data that has been updated is selected in round-robin manner, and the selected group of meta data and the log data are together stored in the flash memory 1100.

Referring to FIG. 10 as an example, in the case where updated groups of meta data at a time point at which the log entry region is fully filled with the log entry information are MD_1 and MD_3, MD_1 and MD_3 are selected in round-robin manner whenever the log entry region is fully filled with the log entry information. The meta data of the selected group and the log data are sequentially stored in the flash memory 1100.

The dirty meta write refers to a way to repeatedly use only changed meta pages when the meta write request is received. According to the dirty meta write, the number of journals to be replayed may decrease in terms of the write workload with the locality, and thus the SPOR time may decrease. The dirty meta write requires a meta garbage collection operation and a meta wear-leveling operation. The above operations may cause an increase in the input/output latency of the host 1500.

Figure 11:
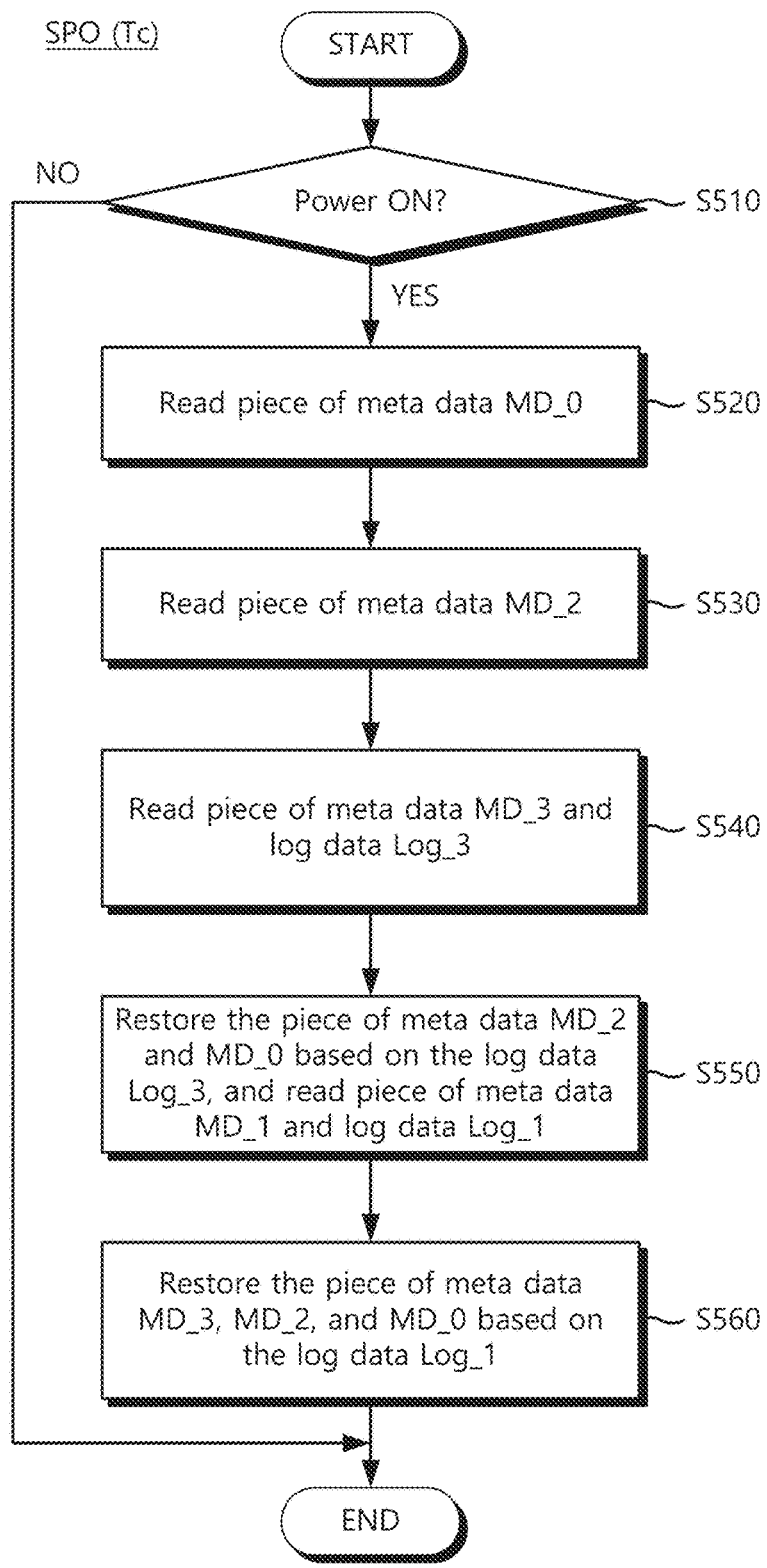
FIG. 11 illustrates a flowchart of an operation of restoring meta data when an abnormal power-off event occurs at a time point Tc in a state where meta data and log data are stored as shown in FIG. 10.

FIG. 11 illustrates a flowchart of an operation of restoring meta data after an abnormal power-off event occurs at a time point Tc in a state where meta data and log data are stored as shown in FIG. 10.

The memory controller 1200 determines whether the memory system is powered on (S510). When the memory system is powered on (Yes at S510), the memory controller 1200 searches for position information of meta data and log data stored in the root information region of the flash memory 1100 and information about the order of storing the meta data therein and reads a group of meta data, which are valid, in the order in which meta data was stored in the flash memory 1100 by using the found information.

It is firstly confirmed from FIG. 10 that MD_0 is valid meta data stored in the flash memory 1100. Accordingly, MD_0 is read and is then stored in the buffer memory 1300 (S520).

Because valid meta data MD_2 was stored in the flash memory 1100 after MD_0, MD_2 is read and is then stored in the buffer memory 1300 (S530).

Because valid (MD_3, Log_3) is stored in the flash memory 1100 after MD_2, (MD_3, Log_3) is read and is then stored in the buffer memory 1300 (S540).

Because MD_2 and MD_0 were written in the flash memory 1100 before a time point at which Log_3 was written, MD_2 and MD_0 stored in the buffer memory 1300 are respectively restored based on Log_3. (MD_1, Log_1) stored in the flash memory 1100 is read after (MD_3, Log_3) and is then stored in the buffer memory 1300 (S550). The process of restoring MD_2 and MD_0 and the process of reading (MD_1, Log_1) may be simultaneously performed.

Because MD_3, MD_2, and MD_0 were written in the flash memory 1100 before a time point at which Log_1 was written, MD_3, MD_2, and MD_0 stored in the buffer memory 1300 are respectively restored based on Log_1. As illustrated in FIG. 10, because meta data and log data are absent from the flash memory 1100 after (MD_1, Log_1), the restoration process ends after operation S560.

When the abnormal power-off event occurs in the memory system, the meta data may be restored through the operation described above. According to embodiments of the inventive concepts, after the host 1500 provides the memory system with data and a command for writing a given data pattern in the memory system, it may be confirmed that the meta data are written in units of a specific size by checking data which are provided and written to the flash memory 1100 constituting the memory system.

Also, according to embodiments of the inventive concepts, in the meta data restoration process, it may be confirmed that the divided meta data of each group are sequentially read from the flash memory 1100 at a specific time interval and are then stored in the buffer memory 1300. The specific time interval may vary depending on the amount of log data written for restoration but shows a trend of mostly increasing in the order of reading the meta data.

The meta data managing module 1236 may effectively perform the meta data managing operation by appropriately using the advantage of the consecution meta write operation and the advantage of the dirty meta write operation. The meta data managing module 1236 may change a write manner (e.g., the consecution meta write or the dirty meta method) based on the number of free meta pages. For example, the meta data managing module 1236 may use the consecution meta write operation, and when the number of free meta pages reaches an initially set threshold value the meta data managing module 1236 may thereafter use the dirty meta write operation.

The memory system according to embodiments of the inventive concepts may avoid performing the meta garbage collection operation by using the meta data managing module 1236, and may perform a meta write selection operation in consideration of the locality. The meta data managing module 1236 may thus decrease the number of journals to be replayed with regard to the write workload with the locality. Accordingly, the open time of the memory system may decrease.

Figure 12:
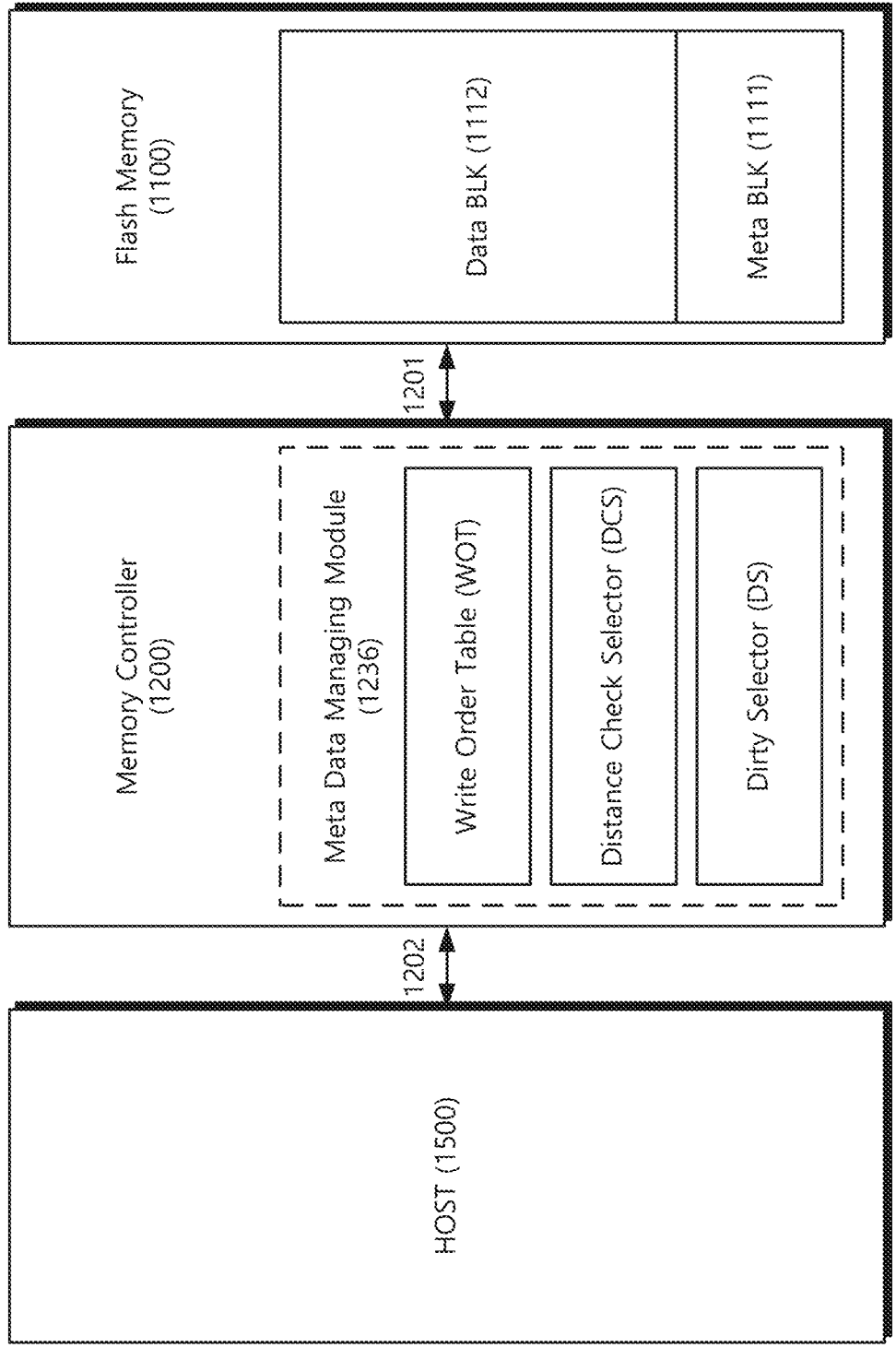
FIG. 12 illustrates a block diagram of an internal configuration of a meta data managing module shown in FIG. 1.
Figure 13:
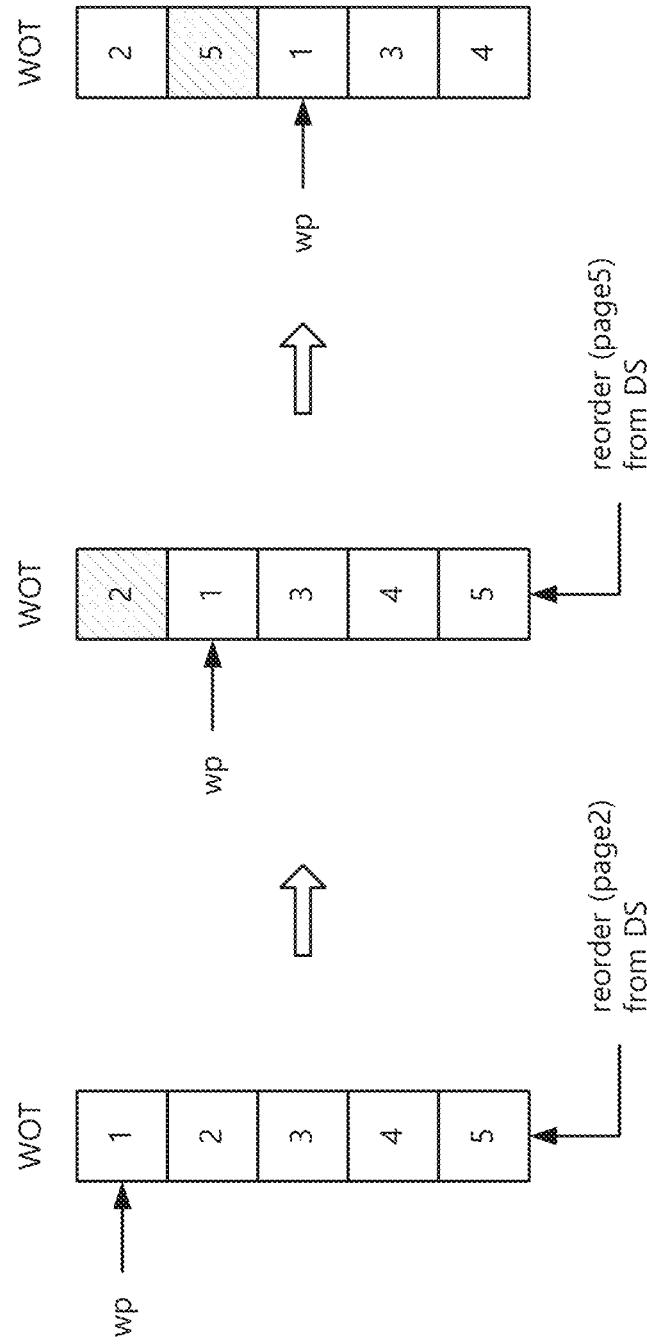
FIGS. 13A, 13B and 13C illustrate how the write order table shown in FIG. 12 may be managed.

FIGS. 12, 13A, 13B and 14 illustrate block diagrams of an internal configuration of a meta data managing module illustrated in FIG. 1 according to embodiments of the inventive concepts. Referring to FIG. 12, the meta data managing module 1236 includes a write order table WOT, a distance check selector DCS, and a dirty selector DS.

The write order table WOT is a page selection table module that stores indication of an order of writing to pages of the meta block 1111 and that does not cause or invoke meta garbage collection. Hereinafter, the events or processing that are performed or controlled so as to not cause or invoke meta garbage collection may be referred to as "No Meta GC". The write order table WOT may manage valid meta pages in the oldest order in the meta block 1111.

For example, the write order table WOT may support three operations: lookup, proceed, and reorder. The lookup operation refers to an operation of returning to a meta page that a write position wp indicates. The proceed operation refers to an operation of increasing the write position wp such that the write position wp indicates a next valid meta page. Reorder (page N) refers to an operation of placing a page N behind the write position wp.

For example, referring to FIG. 13A, when the write order table WOT receives a "reorder (page 2)" command from the dirty selector DS, the meta data managing module 1236 may reorder the pages in the write order table WOT so that page 2 is moved from a location in front of page 1 indicated as the write position wp as shown in FIG. 13A, to a position located behind the write position wp as indicated in FIG. 13B. As a further example, when the write order table WOT receives a "reorder (page 5)" command from the dirty selector DS, the meta data managing module 1236 may reorder an order such that a fifth page page 5 is located behind the write position wp such as shown in FIG. 13C.

The distance check selector DCS is a module for defining and managing a GC-free distance GFD. The GC-free distance GFD means the minimum number of free meta pages at which the meta garbage collection is not caused or invoked. That is, the GC-free distance GFD means the minimum number of free meta pages for the "No Meta GC". Also, the GC-free distance GFD may be obtained by adding a number of additional pages to the minimum number of free meta pages for the "No Meta GC". Herein, the number of additional pages may vary depending on a design algorithm. The GC-free distance GFD may be a set free page count preset depending on design considerations. The GC-free distance GFD may be a preset number of free pages.

Figure 14:
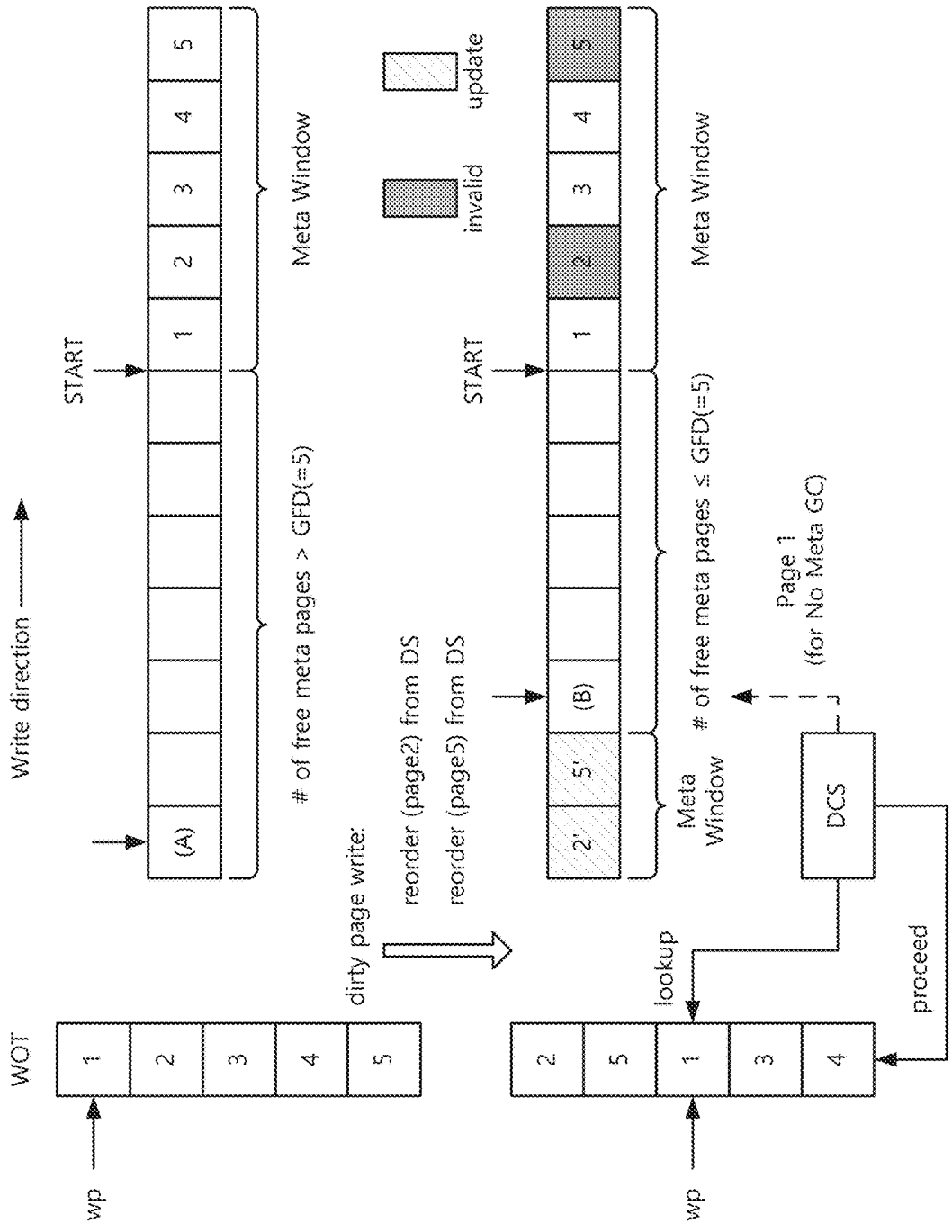
FIG. 14 illustrates a diagram descriptive of a meta write operation of a meta data managing module shown in FIG. 12.

For example, referring to FIG. 14, it is assumed that a meta window of an initial state is from the first page page 1 to the fifth page page 5, and the GC-free distance GFD is "5". The first page is a start page START. Herein, the first page is the oldest valid meta page. The number of free meta pages refers to the number of pages ranging from a page "A", at which the meta write is to be performed, to a page just before (i.e., immediately preceding) the oldest valid meta page (i.e., page 1 in this example).

Because the number of free meta pages, that is "7", is greater than the GC-free distance GFD (=5) as shown in the example of FIG. 14, the dirty meta write operation is performed. In the dirty meta write operation, the write order table WOT may for example receive a "reorder (page 2)" command and move the second page to be located behind the write position wp. Also, the write order table WOT may for example receive a "reorder (page 5)" command and may move the fifth page to be located behind the write position wp.

The distance check selector DCS may perform the dirty meta write operation until the number of free meta pages reaches the GC-free distance GFD (=5). That is, the distance check selector DCS may select a dirty meta page as a write target page. According to the above description, the distance check selector DCS may reflect the write locality.

Referring to FIG. 14, the number of free meta pages may be "5" from a page "B", at which the meta write is to be performed, to the page just before the oldest valid meta page (i.e., page 1). When the number of free meta pages reaches the GC-free distance GFD, the distance check selector DCS may select a page indicated by the write position wp as a write target page and may provide a "lookup" command and a "proceed" command to the write order table WOT such that a next page progresses.

In this case, because the number of free meta pages is equal to the GC-free distance GFD, the meta data managing module 1236 may perform the consecution meta write operation. The meta data managing module 1236 may provide commands to operate so as to allow the meta garbage collection not to be caused.

The dirty selector DS is a module for selecting a meta page targeted for write from among dirty meta pages. The dirty selector DS may include various selection algorithms. Based on a specific selection algorithm, the dirty selector DS may select a meta page, at which the write is to be performed, from among dirty meta pages and may update the write order table WOT such that the selected meta page is located at the last write order (reorder). When the meta write is performed, journals before a page targeted for the meta write are invalidated, and thus, there is no need to replay.

When the meta data are not selected by the selection algorithm, the dirty selector DS may select the write position wp of the write order table WOT as a write page (lookup & proceed). For example, the dirty selection algorithm may be a round-robin, random, or MFU (Most Frequently Updated) algorithm. The round-robin and random algorithms may manage dirty meta pages like a dirty bitmap.

The MFU algorithm may select each meta page based on the number of journals. The MFU algorithm may select a meta page in which the number of journals is maximum. Herein, the journal may refer to the meta data change content. The number of journals may be determined based on a given threshold, and a meta page having journals, the number of which is equal to or greater than the threshold, may be selected as an inspection target. The number of journals may be managed such that when a journal is generated, a journal count of a meta page corresponding to the generated journal is increased. When the meta write is performed, the number of journals of a meta page targeted for the meta write may be initialized.

As described above, the meta data managing module 1236 may include the write order table WOT, the distance check selector DCS, and the dirty selector DS. When the meta write is required due to a journal full event, the distance check selector DCS may check whether the number of free meta pages of the flash memory 1100 reaches a preset GC-free distance GDF with reference to the write order table WOT.

When a check result is true, the write position wp of the write order table WOT is selected as a write page, and the write position wp is then increased. If the check result is false, a request is issued such that the dirty selector DS selects a page. The dirty selector DS may select a next write page from among pieces of dirty meta data through the specific selection algorithm. Afterwards, the write order table WOT is updated such that the selected page is located at the last write order. When the meta page is not selected, the write position wp of the write order table WOT may be selected as a write page.

Figure 15:
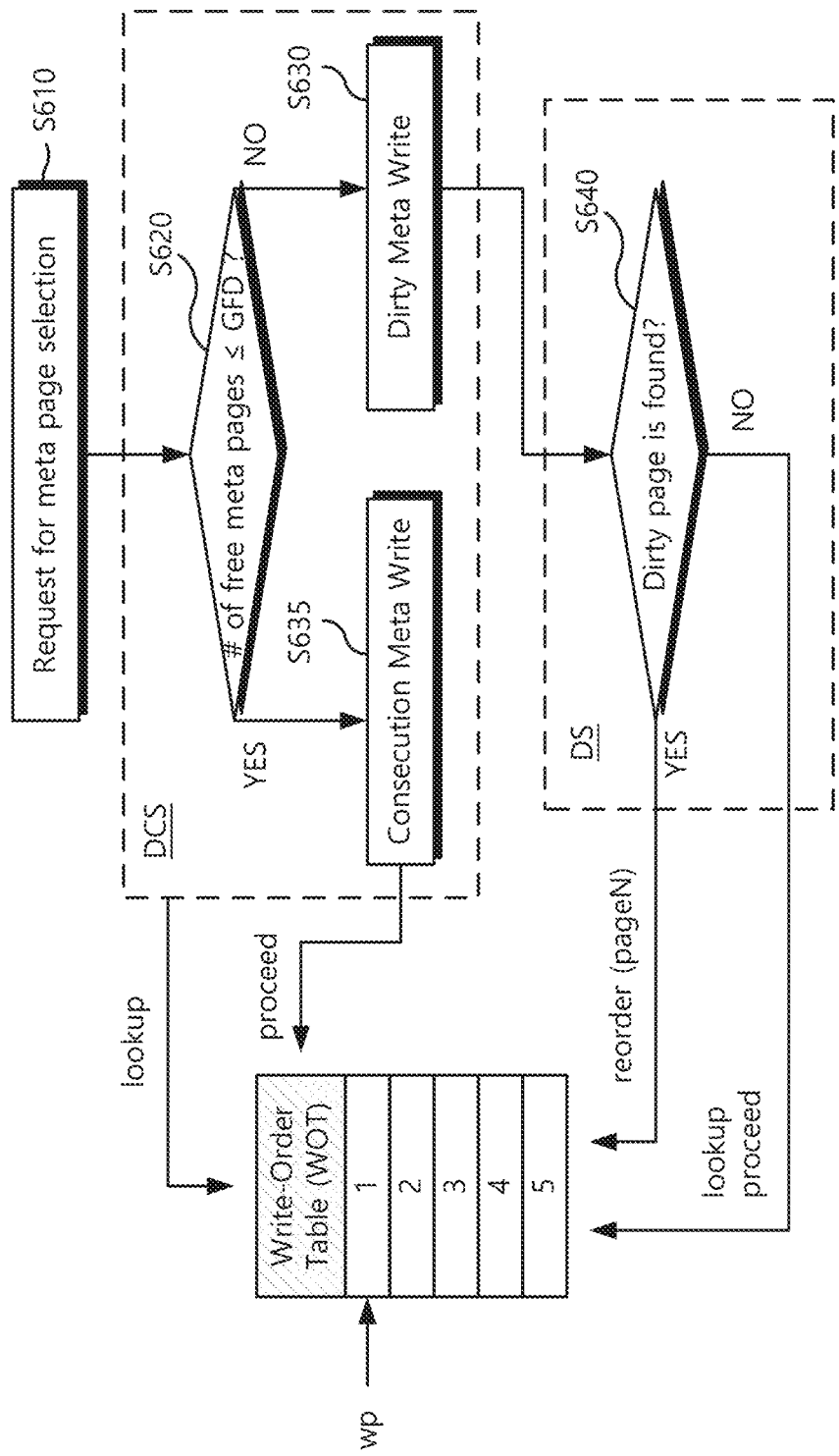
FIG. 15 illustrates a flowchart of an operating method of a meta data managing module shown in FIG. 12.

FIG. 15 illustrates a flowchart of an operating method of a meta data managing module illustrated in FIG. 12. Referring to FIG. 15, the meta data managing module 1236 may receive a request for meta page selection from the host 1500 (S610).

The distance check selector DCS may determine whether the number of free pages is smaller than or equal to a GC-free distance GFD (S620). When the number of free pages is greater than the GC-free distance GFD (No at S620), the distance check selector DCS may perform the dirty meta write operation (S630). When the number of free pages is smaller than or equal than the GC-free distance GFD (Yes at S620), the distance check selector DCS may perform the consecution meta write operation (S635).

In the consecution meta write operation, the distance check selector DCS may provide the "lookup" command such that a page indicated by the write position wp is returned to the write order table WOT. Also, in the consecution meta write operation, the distance check selector DCS may provide the "proceed" command such that the write position wp increases and the write position wp indicates a next valid meta page.

In the dirty meta write operation, the dirty selector DS may determine whether a dirty page is found (S640). When a dirty page is found (Yes at S640), the dirty selector DS may provide the "reorder" command to the write order table WOT such that page "N" (i.e., the dirty page) is located behind the write position wp. When a dirty page is not found (No at S640), the dirty selector DS may provide the "lookup and proceed" command to the write order table WOT.

As described above, a memory system according to embodiments of the inventive concepts may not perform the meta garbage collection operation by using the meta data managing module 1236, and may perform the meta write selection operation in consideration of the locality. The meta data managing module 1236 may decrease the number of journals to be replayed, with regard to the write workload with the locality. According to embodiments of the inventive concepts, the open time of the memory system may decrease.

Figure 16:
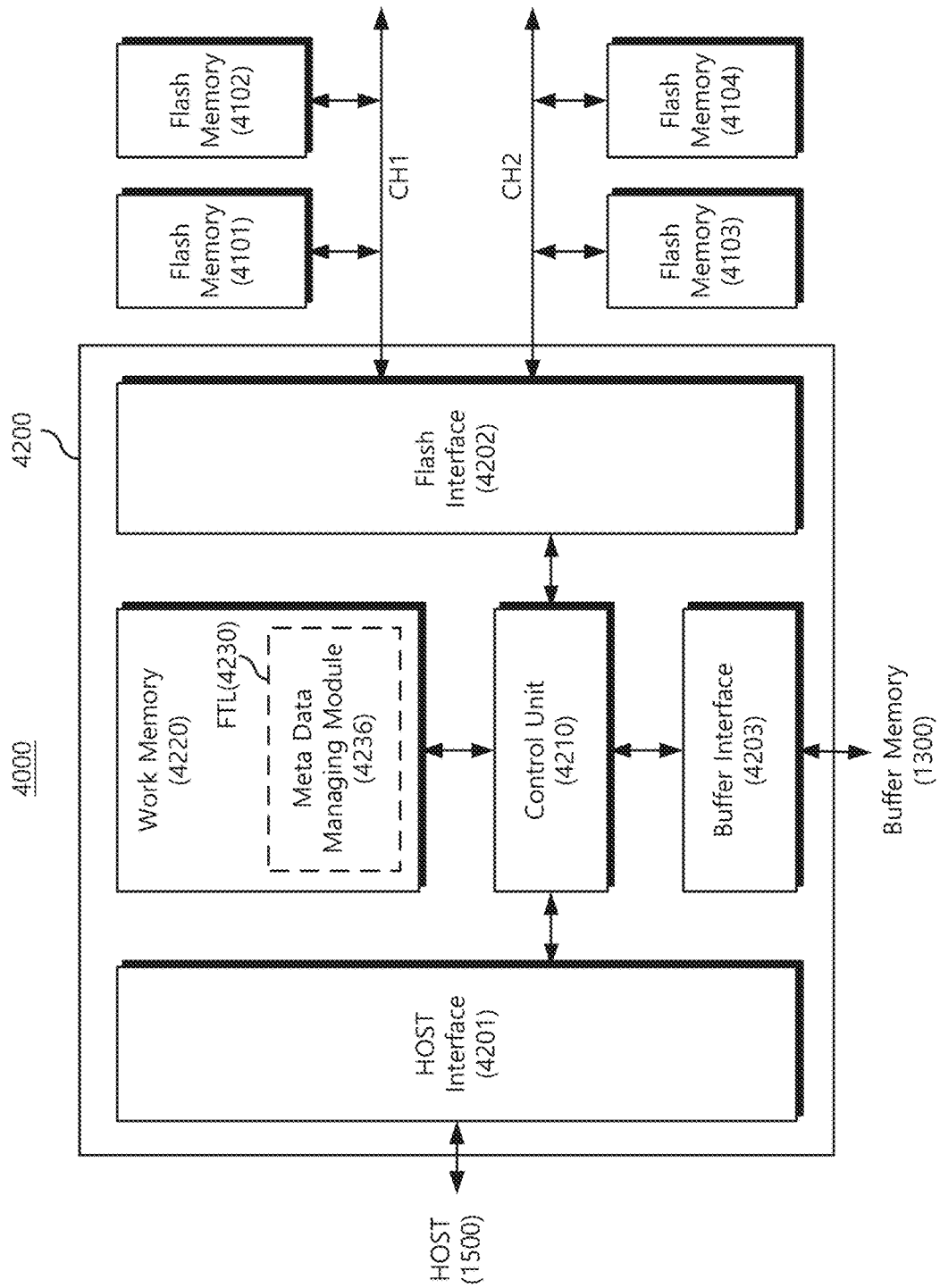
FIG. 16 illustrates a block diagram of an example in which a flash memory and a memory controller of a memory system according to embodiments of the inventive concepts are implemented with a solid state drive (SSD).

FIG. 16 illustrates a block diagram of an example in which a flash memory and a memory controller of a memory system according to embodiments of the inventive concepts are implemented with a solid state drive (SSD). Referring to FIG. 16, an SSD 4000 may include a plurality of flash memories 4101 to 4104 (i.e., flash memories 4101, 4102. 4103 and 4104) and an SSD controller 4200.

The first and second flash memories 4101 and 4102 may be connected with the SSD controller 4200 through a first channel CH1 The third and fourth flash memories 4103 and 4104 may be connected with the SSD controller 4200 through a second channel CH2. The number of channels connected with the SSD controller 4200 may be 2 or more. The number of flash memories connected with one channel may be 2 or more.

The SSD controller 4200 may include a host interface 4201, a flash interface 4202, a buffer interface 4203, a control unit 4210, and a work memory 4220. The work memory 4220 may be used to drive a flash translation layer (FTL) 4230. The flash translation layer 4230 may include a meta data managing module 4236 such as meta data managing module 1236 described with reference to FIGS. 1-15.

The SSD controller 4200 may be connected with the host 1500 through the host interface 4201. Depending on a request of the host 1500, the SSD controller 4200 may write data in the corresponding flash memory or may read data from the corresponding flash memory.

The SSD controller 4200 may be connected with the plurality of flash memories 4101 to 4104 through the flash interface 4202 and may be connected with the buffer memory 1300 through the buffer interface 4203. The flash interface 4202 may provide data, which are temporarily stored in the buffer memory 1300, to the flash memories through the channels CH1 and CH2. The flash interface 4202 may transfer the data read from the flash memories 4101 to 4104 to the buffer memory 1300.

The control unit 4210 may analyze and process the signal received from the host 1500. The control unit 4210 may control the host 1500 or the flash memories 4101 to 4104 through the host interface 4201 or the flash interface 4202. The control unit 4210 may control operations of the flash memories 4101 to 4104 by using firmware for driving the SSD 4000.

The work memory 4220 may drive the flash translation layer 4230 under control of the control unit 4210. When the SSD 4000 is booted up, the flash translation layer 4230 may be loaded to the work memory 4220 from the flash memories 4101 to 4104. The flash translation layer 4230 may perform an address mapping operation, a garbage collection operation, a meta data management operation, etc. depending on a function implemented by the firmware.

The SSD controller 4200 may manage meta data or cache data to be stored in the flash memories 4101 to 4104. In the sudden power-off operation, the SSD controller 4200 may back-up the meta data or cache data stored in the work memory 4220 or the buffer memory 1300 to the flash memories 4101 to 4104.

A flash memory-based memory system according to embodiments of the inventive concepts may avoid performing a meta garbage collection operation by using a meta data managing module, and may perform a meta write selection operation in consideration of locality. According to embodiments of the inventive concepts, it may be possible to decrease the number of journals to be replayed, with regard to the write workload with locality. Also, according to embodiments of the inventive concepts, it may be possible to decrease an open time of the memory system.

While the inventive concepts have been described with reference to embodiments thereof, it should be apparent to those of ordinary skill in the art that various changes and modifications may be made thereto without departing from the spirit and scope of the inventive concepts as set forth in the following claims.

What is claimed is:

1. A memory system comprising:
   a flash memory including a meta block and a data block, the meta block including a plurality of pages; and
   a memory controller including a meta data managing module configured to manage meta data to be stored in the meta block,
   wherein the meta data managing module is configured to compare a number of free pages from among the plurality of pages with a set free page count to provide a comparison result, and
   depending on the comparison result, select a write operation from a consecution meta write operation and a dirty meta write operation, and select a write target page of the meta data from among the free pages by using the selected write operation, wherein the consecution meta write operation is a write operation that uses all meta pages in round-robin manner regardless of changed meta pages, and the dirty meta write operation is a write operation that uses only changed meta pages.

2. The memory system of claim 1, wherein the number of free pages corresponds to a number of pages from a first page to a second page from among the free pages, the first page being a page at which a meta write is to be performed, and the second page being a page immediately preceding an oldest valid page from among the plurality of pages.

3. The memory system of claim 2, wherein the set free page count corresponds to a minimum number of free pages at which meta garbage collection is not invoked.

4. The memory system of claim 3, wherein when the number of the free pages is greater than the set free page count, the meta data managing module selects the write target page of the meta data by using the dirty meta write operation.

5. The memory system of claim 4, wherein when the number of free pages is less than or equal to the set free page count, the meta data managing module selects the write target page of the meta data by using the consecution meta write operation.

6. The memory system of claim 2, wherein the set free page count corresponds to a page count obtained by adding a minimum number of free pages at which meta garbage collection is not invoked and a number of additional pages.

7. The memory system of claim 1, wherein the meta data managing module comprises:
a page selection table module configured to store indication of an order of writing to the free pages of the meta block and that doe not invoke meta garbage collection;
a distance check selector configured to manage the set free page count, to compare the number of free pages and the set free page count to provide the comparison result, and to manage the consecution meta write operation or the dirty meta write operation depending on the comparison result; and
a dirty selector configured to select a meta page targeted for write from among dirty meta pages of the plurality of pages.

8. The memory system of claim 7, wherein the page selection table module is configured to perform a lookup operation for returning to a page indicated by a write position, a proceed operation for increasing the write position such that a next valid page from the plurality of pages is indicated, and a reorder operation for adjusting the order such that an n-th page is located behind the write position.

9. The memory system of claim 7, wherein the distance check selector is configured to calculate a number of pages from a page from among the free pages at which a meta write is to be performed to a page from among the free pages immediately preceding an oldest valid page from among the plurality of pages, and determine whether the calculated number of pages reaches the set free page count.

10. The memory system of claim 7, wherein the dirty selector is configured to select the meta page targeted for the write from among the dirty meta pages depending on a selection algorithm, and update the page selection table module such that the selected meta page is located at a last write order.

11. A meta data managing method of a memory system which is based on a flash memory including a meta block, the meta block including a plurality of pages, the method comprising:
comparing a number of free pages from among the plurality of pages with a set free page count to provide a comparison result; and
depending on the comparison result, selecting a write operation from a consecution meta write operation and a dirty meta write operation, and selecting a write target page of meta data from among the free pages by using the selected write operation, wherein the consecution meta write operation is a write operation that uses all meta pages in round-robin manner regardless of changed meta pages, and the dirty meta write operation is a write operation that uses only changed meta pages,
wherein selecting the write target page comprises
selecting the write target page of the meta data using the dirty meta write operation when the number of free pages is greater than the set free page count, and
selecting the write target page of the meta data using the consecution meta write operation when the number of free pages is less than or equal to the set free page count.

12. The method of claim 11, wherein the number of free pages corresponds to a number of pages from a first page to a second page from among the free pages, the first page being a page at which a meta write is to be performed, and the second page being a page immediately preceding an oldest valid page of the plurality of pages, and
wherein the set free page count corresponds to a minimum number of free pages at which meta garbage collection is not invoked.

13. The method of claim 12, wherein the comparing comprises:
calculating the number of pages from the page, at which the meta write is to be performed to the page immediately preceding the oldest valid page; and
determining whether the calculated number of pages reaches the set free page count.

14. The method of claim 12, further comprising maintaining a page selection table module storing indication of an order of writing to the free pages,
wherein the selecting of the write target page comprises performing a lookup operation for returning to a page indicated by a write position, a proceed operation for increasing the write position such that a next valid page from among the plurality of pages is indicated, and a reorder operation for adjusting the order such that an n-th page is located behind the write position are performed, using the page selection table module.

15. The method of claim 14, wherein the selecting of the write target page comprises:
selecting the page targeted for the write from among dirty meta pages from among the plurality of pages depending on a selection algorithm; and
updating the page selection table module such the selected meta page is located at a last write order.

16. A memory controller connected with a flash memory including a meta block, the meta block including a plurality of pages, the memory controller comprising:
a page selection table module configured to store indication of an order of writing meta data to free pages from among the plurality of pages and that does not invoke meta garbage collection;
a distance check selector configured to manage a set free page count, to compare a number of free pages and the set free page count to provide a comparison result, and to select a write operation from a consecution meta write operation and a dirty meta write operation to the meta block depending on the comparison result, wherein the consecution meta write operation is a write operation that uses all meta pages in round-robin manner regardless of changed meta pages, and the dirty meta write operation is a write operation that uses only changed meta pages; and a dirty selector configured to select a meta page targeted for write as a write target page from among dirty meta pages of the plurality of pages, wherein the distance check selector is configured to select the write target page of the meta data using the dirty meta write operation when the number of free pages is greater than the set free page count, and select the write target page of the meta data using the consecution meta write operation when the number of free pages is less than or equal to the set free page count.

17. The memory controller of claim 16, wherein the page selection table module is configured to perform a lookup operation for returning to a page indicated by a write position, a proceed operation for increasing the write position such that a next valid meta page from among the plurality of pages is indicated, and a reorder operation for adjusting the order such that an n-th page is located behind the write position.

18. The memory controller of claim 16, wherein the distance check selector is configured to calculate a number of pages from a page from among the free pages at which a meta write is to be performed to a page immediately preceding an oldest valid page from among the plurality of pages, and determine whether the calculated number of pages reaches the set free page count.

19. The memory controller of claim 16, wherein the dirty selector is configured to select the meta page targeted for the write from among the dirty meta pages depending on a selection algorithm, and update the page selection table module such that the selected meta page is located at a last write order.

20. The memory controller of claim 16, wherein the set free page count corresponds to a minimum number of free pages at which meta garbage collection is not invoked.

* * * * *